March 14, 1950 V. CHRISTENSEN 2,500,602
SELF-CONTAINED BOAT TRAILER
Filed Dec. 17, 1945 2 Sheets-Sheet 1
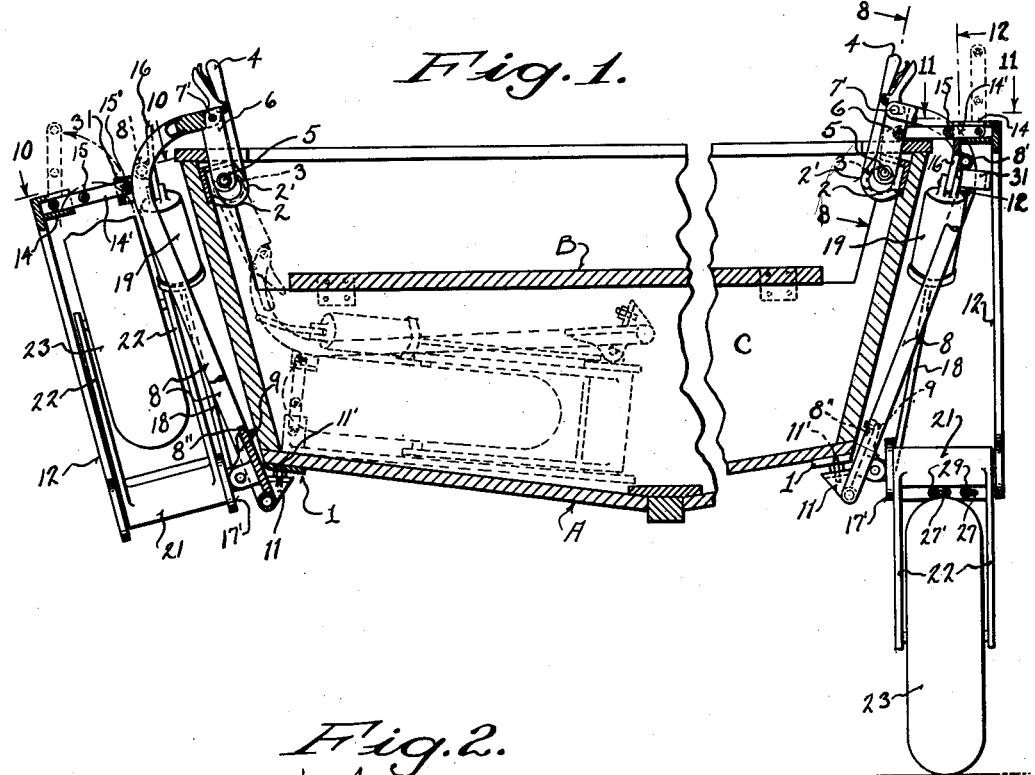
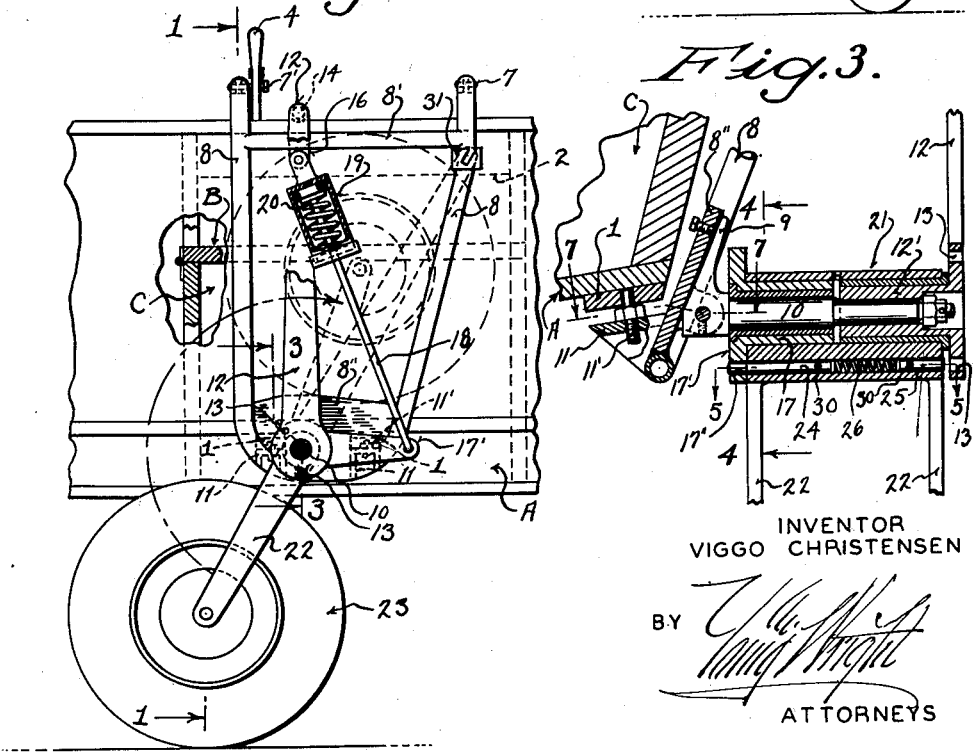
INVENTOR
VIGGO CHRISTENSEN
BY
ATTORNEYS March 14, 1950 V. CHRISTENSEN 2,500,602
SELF-CONTAINED BOAT TRAILER
Filed Dec. 17, 1945 2 Sheets-Sheet 2
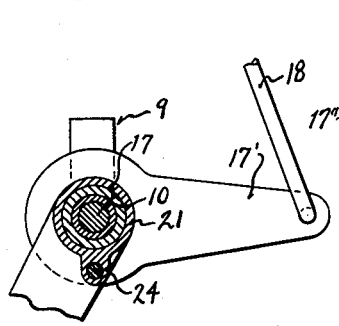
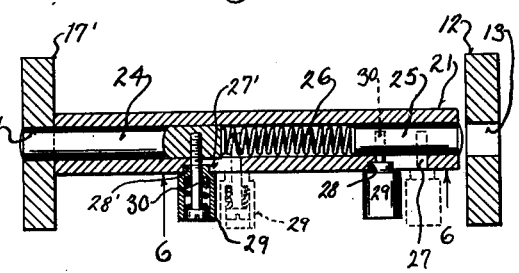
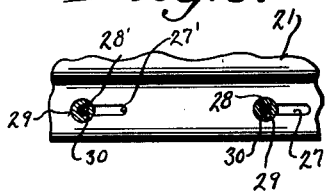
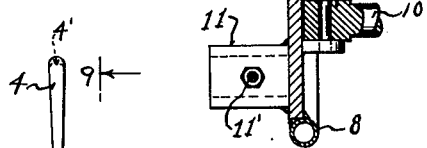
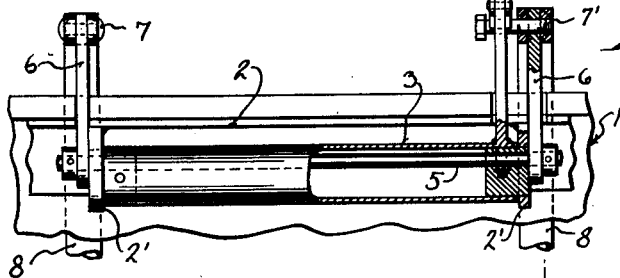
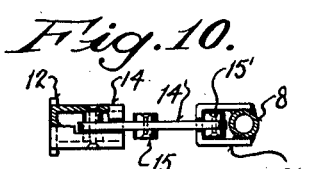
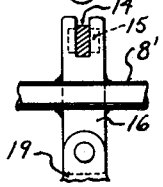
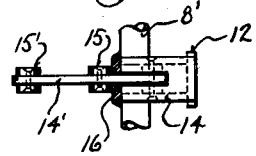
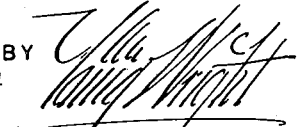
INVENTOR
VIGGO CHRISTENSEN
BY
ATTORNEYS Patented Mar. 14, 1950

2,500,602

UNITED STATES PATENT OFFICE 2,500,602

SELF-CONTAINED BOAT TRAILER

Viggo Christensen, Milwaukee, Wis.

Application December 17, 1945, Serial No. 635,468

1 Claim. (Cl. 280—61)

My invention has for its object to provide a convenient and simple manually actuated foldable pair of wheels attachable to any type of small boat, whereby the same is converted into a trailer for coupling connection to a vehicle, in order that the boat may be transported from one body of water to another.

A further object of my invention is to provide a skeleton frame in clamp connection with the side and bottom of a boat, the same carrying a pivoted spring controlled wheel, with means for raising and lowering said wheel, and other means for collapsing or folding the unit compactly within the boat when not in use. The said apparatus is particularly adapted for fishermen.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Fig. 1 represents a cross sectional view of a boat having attached thereto trailer unit wheels embodying the features of my invention, one of said wheels being in position for trailer purposes, and the other companion unit wheel being folded upwardly, the section being indicated by line 1—1 of Fig. 2.

Fig. 2 is a fragmentary side elevation of the same illustrating the wheel in its trailing position.

Fig. 3 is an enlarged detail sectional view through one corner of the boat illustrating particularly the axle hub structure from which the wheel forks are mounted, the section being indicated by line 3—3 of Fig. 2.

Fig. 4 is a cross sectional view of the axle hub mechanism, the section being indicated by line 4—4 of Fig. 3.

Fig. 5 is a detail longitudinal sectional view through said hub mechanism illustrating lock and release mechanism, the section being indicated by line 5—5 of Fig. 3.

Fig. 6 is a fragmentary detail face view of the hub locking mechanism, with parts in section to more clearly illustrate structural features.

Fig. 7 is a detail plan sectional view through the hub and frame, the section being indicated by line 7—7 of Fig. 3.

Fig. 8 is a detail side elevation of the frame suspension means, the section being indicated by line 8—8 of Fig. 1.

Fig. 9 is a cross section of said suspension means, the section being indicated by line 9—9 of Fig. 8.

Fig. 10 is a detail sectional plan view upon line 10—10 of Fig. 1, illustrating a coupling connection between the frame and a brace rod thereof, when the wheel is folded upwardly upon its pivot.

Fig. 11 is a similar detail sectional elevation through the coupling mechanism, when the brace-bar is in its functioning position, the section being indicated by line 11—11 of Fig. 1; and Fig. 12 is a detail fragmentary face view of the yoke brace-bar locking tongue, partly in section, as indicated by line 12—12 of Fig. 1.

Referring by characters to the drawings, A indicates a boat and B a hinged seat therein. The bottom corner connection of the boat has secured thereto pairs of centrally apertured plates 1—1, and above said plates the gunwale of the boat has secured thereto an angle iron strip 2, having apertured ears 2' extending therefrom.

As best shown in Figures 8 and 9, a headed sleeve 3 is seated into the angle iron ear apertures, which sleeve has extending upwardly therefrom a handle 4. Mounted eccentrically in the sleeve and extending through its heads, is a rod 5, having mounted thereon a pair of links 6, normally projecting above the boat gunwale.

The upper ends of the links 6 are connected by pivot bolts 7—7' to the ends of inwardly bowed arms 8 of a skeleton U-shaped yoke frame. Adjacent the bowed ends of the yoke arms, a cross brace 8' connects the same, as best indicated in Figures 1 and 2 of the drawings.

The bottom portion of the U-shaped yoke, or frame, is connected by a web 8'', having companion ears projecting therefrom for pivotal connection with a shoe portion 9, from which extends an axle 10, as best indicated in Figures 3, 4, and 7. A pair of spaced feet 11 project inwardly from the frame web, carrying pins 11', which engage the apertures of plates 1—1, as shown in Figures 1 and 3 of the drawings.

A wheel brace-bar 12, having a sleeve 12', is mounted upon the axle 10 and the flared base of the rod, adjacent its axes, is provided with a pair of locking apertures 13. The upper end of the brace-bar terminates with a key-hole slotted coupling head 14, having pivoted therein a tie-link 14', provided with spaced lugs 15—15'.

As shown in Figures 1 and 11 of the drawings, the brace-bar is coupled to a slotted end tongue 16, extending from the cross brace 8', by interlocked engagement with the lugs 15—15' of the tie-link 14, whereby said brace-bar 12 resists load strain.

As best indicated in Fig. 3 of the drawings, the base portion of the axle 10 has mounted thereon a sleeve 17, from which sleeve projects outwardly a flanged crank 17', the flanged portion of said crank being provided with a locking aperture 17".

The crank 17' has extended upwardly therefrom a piston rod 18, which piston rod is mounted in a cylinder 19, having fitted therein a coil spring 20, interposed between the bottom of the cylinder and piston portion of the rod 18. The upper end of the cylinder, in turn, is pivotally connected to the lower end of the yoke frame tongue 16.

Loosely mounted upon the concentric sleeves 12', 17', is a hub 21, having forks 22 extending downwardly therefrom, between which forks is rotatively mounted a wheel 23, preferably of the rubber tired type.

As best illustrated in Figures 2 and 3 of the drawings, the forked hub 21 is bored for the reception of a plunger 24 at its rear portion, and a similar plunger 25 at its front portion, the plungers having a coil spring 26 therebetween, whereby the same are forced outwardly.

For locking and releasing the plungers, the extension of the hub 21 is provided with a pair of slots 27—27'. The left hand ends of each slot are formed with circular locking depressions 28—28', for engagement with a spring controlled handle 29, which handles are attached to the plungers 24—25 by bolts 30. Hence, as indicated in Fig. 3 of the drawings, the plunger 25 is retracted from the aperture of the brace-bar, while the plunger 24, which has been fixed in its locked position, engages the aperture 17" in the flange portion of the crank 17', it being obvious that the spring interposed between these plungers forces the same into their locked positions.

As best indicated in Figures 8 and 9 of the drawings, the handle 4, which extends from the sleeve 3, has mounted thereon a spring controlled pivoted locking dog 4', which dog, at its lower end, is formed with a socket 4", shown especially in Fig. 9 in full and dotted lines. Obviously this handle and dog constitute the means for locking the skeleton frame in approximate parallel relations with the side of the boat, and the lock is effected by engagement of the dog socket 4" with the pin 7', which constitutes a pivot connection between the yoke arm 8 and the link 6.

When the wheels are in the position shown in Fig. 2 of the drawings, they serve as trailer supports for the boat and, owing to the fact that the crank 17' and wheel forks 22 are locked together, the wheel will float under the tension of the coil spring and piston connection.

Should it be desired to raise the wheels, the supporting forked hub thereof is disconnected from the spring controlled crank 17' by retracting the plunger 24 from its locked position, relative to the fork hub. The wheel is then rotated upwardly to the approximate position, as indicated in dotted lines, in which position it is locked by the plunger 25, engaging the upper aperture in the flange portion of the brace-bar 12. When the brace-bar is locked to the hub, it serves as a lever to raise and lower the wheels.

To further compactly confine these parts in a restricted folded position, as shown to the left in Fig. 1 of the drawings, the tie-link 14', of the brace-bar, is disconnected from the slotted tongue 16 and said brace-bar is then swung from left to right (see Fig. 2) in alignment with a keyhole slotted socket 31, extending from the right hand yoke arm 8, to the position as indicated in full lines of Fig. 1, wherein the wheel is folded upwardly, in which position the tie connection between the brace-bar and yoke arm 8 is effected, by inserting the lugs 15' into the socket.

The unit is now in folded position to be rocked upon the links 6 into and resting upon the bottom of the boat, as indicated in dotted lines, in which dotted position the unit is nested within a box C, under the seat B.

Prior to the movement of swinging the unit into the boat, about the rod 5, it will be necessary to disconnect the bottom of the yoke frame from the bottom corner of the boat. This movement is effected (see Figures 8 and 9) by compressing the locking dog 4', whereby it is disconnected from the pivot bolt 7', and the handle 4 is then swung downwardly to the position indicated in dotted lines of Fig. 9. The swinging movement of the handle will cause the sleeve 3 to eccentrically rock downward upon the rod 5, whereby the links 6 will cause the yoke arms 8 to drop downwardly, as indicated in dotted lines of Fig. 9, and thereby release the pins 11' from the plates 11, thus freeing the entire unit, whereby it will swing upon the link or toggle connections, positioned at the gunwale of the boat.

I claim:

In a pair of foldable wheel trailer attachments for a boat having a gunwale and bottom corners, each comprising a yoke frame, apertured plates secured to the bottom corners of a boat, pins extending from the lower ends of the yoke frame engaging the plate apertures, angle irons secured to the gunwale of a boat, apertured ears extending from the angle irons, sleeves journaled in the ears of said angle irons, handles extending upwardly from each sleeve, rods eccentrically mounted in said sleeves, pairs of links extending upwardly from each rod, pivots connecting between the links and yoke frames to the sides of a boat, whereby the trailer wheels are held in their boat trailing position, dogs carried by each handle for locking its associated yoke frame to the boat sides, axles extending from the lower ends of each yoke frame, sleeves mounted upon said axles, cranks extending from the sleeves, a yielding connection between the cranks and yoke frames, forked hubs mounted upon axles, a wheel mounted between the forks of each hub and means for selectively locking the cranks, connected sleeves and fork hubs together.

VIGGO CHRISTENSEN.

REFERENCES CITED

The following references are of record in the file of this patent:

UNITED STATES PATENTS

| Number | Name | Date |
|---|---|---|
| 2,219,254 | Davis | Oct. 22, 1940 |
| 2,410,570 | Davis | Nov. 5, 1946 |